United States Patent [19]

Carmody

[11] 4,191,998
[45] Mar. 4, 1980

[54] VARIABLE SYMMETRY MULTIPHASE CLOCK GENERATOR

[75] Inventor: Joseph P. Carmody, Willow Grove, Pa.

[73] Assignee: Honeywell Inc., Minneapolis, Minn.

[21] Appl. No.: 891,076

[22] Filed: Mar. 29, 1978

[51] Int. Cl.² .............................................. G06F 1/04
[52] U.S. Cl. ...................................... 364/200; 328/62; 307/269
[58] Field of Search ... 364/200 MS File, 900 MS File, 364/701; 307/221 R, 265, 267, 269; 328/62

[56] References Cited

U.S. PATENT DOCUMENTS

| | | | |
|---|---|---|---|
| 3,268,820 | 8/1966 | Newman et al. | 328/62 |
| 3,551,822 | 12/1970 | McNelis | 328/62 |
| 3,564,377 | 2/1971 | Evans et al. | |
| 3,590,280 | 6/1971 | Hudson et al. | 328/62 X |
| 3,675,133 | 7/1972 | Frankeny et al. | 307/265 X |
| 3,792,362 | 2/1974 | Grant. | |
| 3,836,858 | 9/1974 | Kitano | 307/265 |
| 3,946,255 | 3/1976 | Stein | 307/269 |
| 3,968,445 | 7/1976 | Sherman | 307/265 |
| 3,978,424 | 8/1976 | Hobo et al. | 328/62 X |
| 4,012,591 | 3/1977 | Sailer et al. | |
| 4,037,090 | 7/1977 | Raymond, Jr. | 364/900 X |

OTHER PUBLICATIONS

D. McGlynn, "Microprocessors Technology, Architecture, and Applications", publ. John Wiley & Sons, pp. 120, 122.

*Primary Examiner*—Mark E. Nusbaum
*Assistant Examiner*—Thomas M. Heckler
*Attorney, Agent, or Firm*—Laurence J. Marhoefer; Lockwood D. Burton

[57] ABSTRACT

The clock generator, which is shown as being a part of a data processor, includes a recirculating shift register and gate combination for deriving a set of four clock phase signals from a master clock signal. The generator also includes two gates and a D flop which form sequential circuitry. The latter controls the shift register to impart a desired nonsymmetry to the clock signals, and to vary that symmetry, as necessary to minimize the clock cycle time and to maximize the processor operating speed. To this end, the circuitry normally makes the clock pulse widths a minimum, consistent with the processor requirements, and, on demand, doubles the widths of only those clock pulses which are actually timing the slowest processor portion, thereby lengthening only those specific clock cycles which contain the demanded widened clock pulses.

14 Claims, 2 Drawing Figures

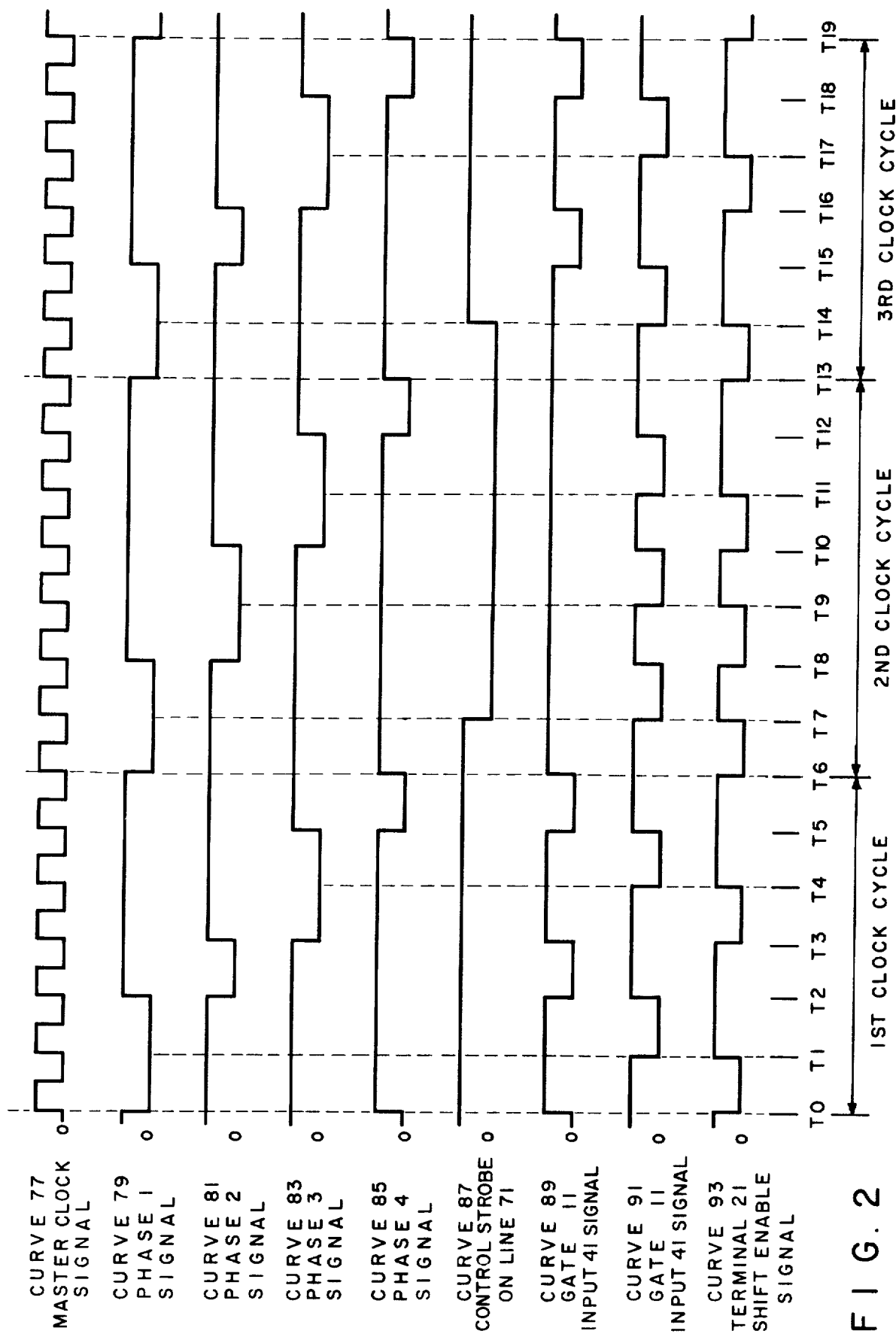

VARIABLE SYMMETRY MULTIPHASE CLOCK GENERATOR

BACKGROUND OF THE INVENTION

1. Field Of The Invention

The present invention relates generally to the field of digital data processing apparatus, hereinafter referred to simply as processors, and relates specifically to the timing or clock portion of such processors which times the operation of the other processor portions. More specifically, the invention relates to the clock generator of such clock portions which responds to the output of the associated clock oscillator or master clock of the clock portion to produce one or more clock phase signals which, in turn, do the actual timing of the operation of the other processor portions.

2. Description Of The Prior Art

The known forms of the above-noted clock generators, as used in the known processors, are usually of the multiphase type, that is, of the type wherein the generator produces a set of two or more of the above-noted clock phase signals within the processor. Accordingly, the present description will be directed to such multiphase generators.

Within the known processors embodying multiphase clock generators, the clock phase signals, which will be referred to hereinafter simply as clock signals, are distributed among the portions, circuits, or devices of the processor which require clocking or timing. Such portions will be referred to hereinafter simply as the timed portions of the processor. The number of clock signals which the generator produces in a given processor, and the manner in which such signals are utilized, are dictated by the nature of that processor.

Each of the clock signals in a typical processor consists of a series of timing or clock pulses, and the pulses of the several clock signals are phased in accordance with the requirements of the processor. The pulse width and phasing of the several clock signals collectively determine the clock cycle time and clock frequency, and hence the operating speed of the processor.

In order to make the operating speeds of the known processors as high as possible, as is desirable, the clock signal pulse widths in those processors have been made to be as small as possible. However, such pulse widths have to be sufficiently large to meet the operating time requirements, and hence to match the operating speeds, of all of the timed portions which have their operations timed by those clock pulses. Those operating time requirements of the several timed portions of the usual processor cover a sizable range.

Because of the conditions just noted, it has become the practice to make the pulses of each clock signal in a processor to have a fixed, predetermined width which meets the operating time requirements of the slowest one of only those of the timed portions which that clock signal times. Due to the above-noted extent of the differences in operating speeds of the timed portions of the usual processor, this practice permits the pulse width for a given clock signal to be significantly smaller than that for another of the clock signals, and provides a desirable increase in processor operating speed. Such clock signals are referred to as being nonsymmetrical. An example of a processor including a multiphase clock generator which provides a set of nonsymmetrical clock signals is disclosed in the Raymond U.S. Pat. No. 4,037,090.

Although the known generator arrangements which provide nonsymmetrical clock signals give the desired increases in processor operating speed noted above, such arrangements have also been more complex than is often desired. Thus, a need exists for a nonsymmetrical clock generator of relatively simple form.

Additionally, in an effort to increase processor operating speeds as much as possible, the operating speeds of the timed portions of the known processors have been increased over the years. This has permitted corresponding reductions in clock pulse widths and clock cycle times which have resulted in significant increases in clock frequencies and processor operating speeds. Nevertheless, the operating speeds of the known processors are still not as high as is desired. The reason for this is that the operating speed of a processor of the known type is still, basically, dictated and limited, and hence degraded, by the operating time requirements of the slower or slowest ones of the timed portions.

SUMMARY OF THE INVENTION

Accordingly, it is an object of the present invention to provide an improved form of processor wherein the operating speed is significantly increased without requiring any increase in the operating speeds of the timed portions of the processor. A more specific object of the invention is to provide improved clock generator apparatus which is operative to provide such increased processor operating speeds. Another object of the invention is to provide a nonsymmetrical clock generator of desirably simple construction.

To the end of accomplishing the above-noted and other desirable objects, the improved clock generator according to the present invention utilizes only a relatively simple group of components to produce a set of nonsymmetrical clock signals. Also in accordance with the invention, those components include means responsive to the accessing or strobing of the slower ones of the associated timed portions to increase the length of only those clock pulses which are actively timing such slower portions. Specifically, according to the present invention, when a slower one of the timed portions is accessed, a control signal is applied to the improved clock generator, and the latter responds to that signal to effect the required lengthening of only that clock pulse which is responsible for the timing of that particular portion. As a result, the operating speeds of the slower timed portions have much less effect on the processor operating speed. Consequently, the clock frequency and operating speed of the processor can be significantly increased, in keeping with the operating speeds of the faster ones of the timed portions, without requiring any increase in the operating speeds of any of the timed portions, and without causing any of those portions to be subjected to shorter clock pulses than they require for providing proper response.

BRIEF DESCRIPTION OF THE DRAWING

A better understanding of the present invention may be had from the following detailed description when read in connection with the accompanying drawing, wherein:

FIG. 2 is a series of curves illustrating the operation of the FIG. 1 apparatus for a typical situation.

Figure 1:
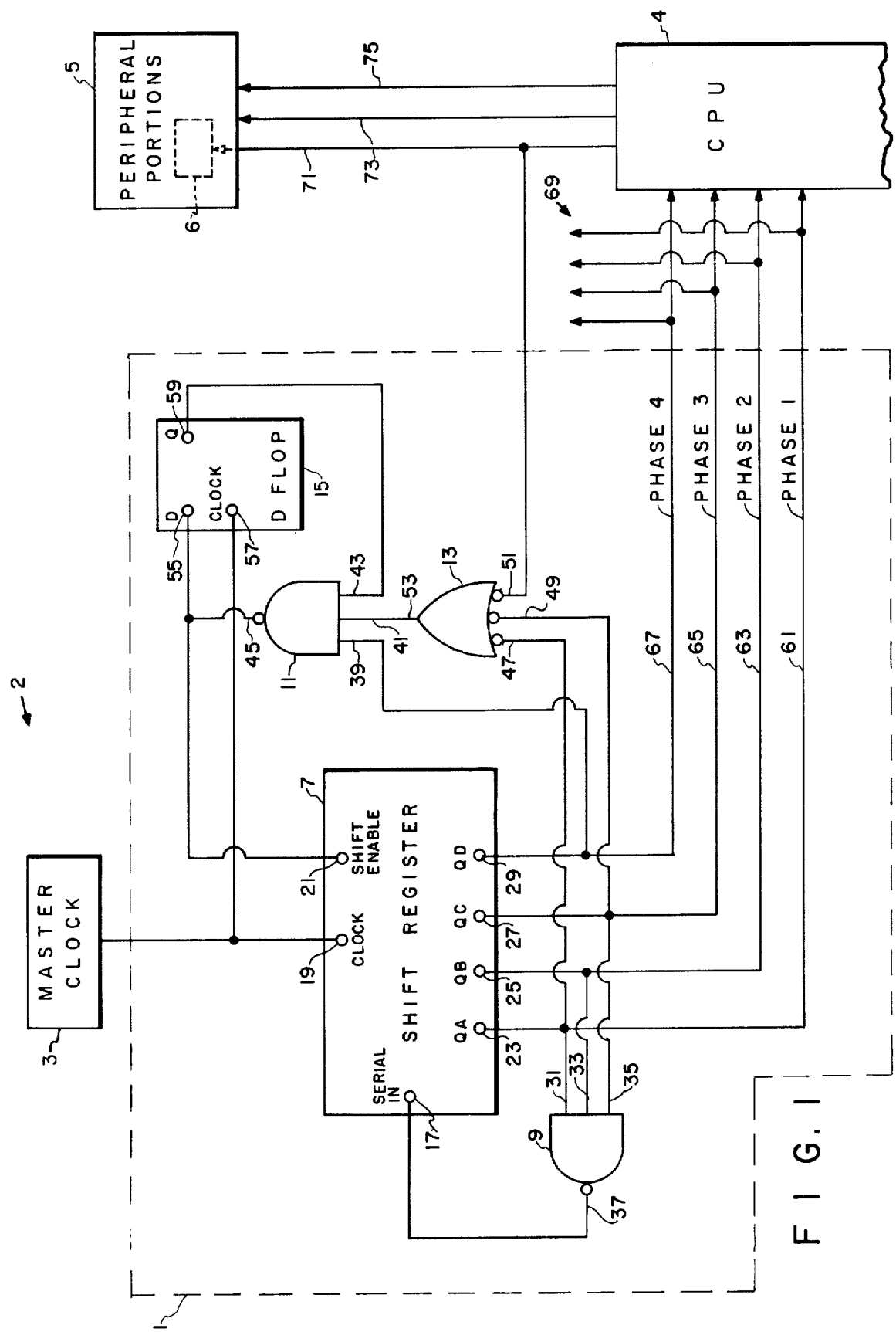
FIG. 1 shows the circuit diagram of a processor which includes a clock generator representing a preferred embodiment of the above-noted improved generator apparatus according to the present invention.

DETAILED DESCRIPTION
THE APPARATUS OF FIG. 1

The apparatus shown in FIG. 1 of the drawing illustrates at 1 a preferred example of the above-noted improved clock generator embodying the present invention. The generator 1 is shown, by way of example, as being a part of the clock portion 2 of a typical processor, such as a microprocessor. The clock portion 2 also includes the usual master clock or clock oscillator 3 which produces in its output the usual master clock signal.

In addition to the clock portion 2, the FIG. 1 processor includes, in the conventional manner, the usual complement of other, conventional processor portions. These include a central processing unit (CPU) 4 and the usual complement of cooperating peripheral portions or devices. These latter portions have been shown collectively at 5 in order to avoid unduly complicating the drawings. It is to be understood that the FIG. 1 processor also includes the usual interconnections between the CPU 4, the portions 5, and the outside world. To avoid unduly complicating the drawing, the latter includes only that much of the CPU 4 and its connections which is needed to illustrate the cooperation between the CPU 4 and the generator 1.

Included in the group of peripheral portions 5 are those of the timed portions of the processor, such as memory and input/output devices, which are peripheral to the CPU 4. The operation of those timed portions is controlled by the CPU 4, and is timed by the clock signals which are produced by the generator 1.

In connection with the present disclosure, certain typical characteristics and timing requirements have been assumed as being possessed by the FIG. 1 processor, and the illustrated construction of the generator 1 is that which meets those requirements. The latter may be summarized as follows:

1. The generator 1 is to provide four nonoverlapping, nonsymmetrical clock signals wherein the pulse width of the first and third clock signals is normally twice the pulse width of the second and fourth clock signals;

2. One of the timed ones of the peripheral portions 5 has such an operating time requirement or operating speed as to categorize that portion as the slowest portion of the processor. By this it is meant that this slowest portion takes a significantly longer time to operate in a valid manner, when accessed, than do any of the others of the timed portions. For the purposes of the present illustrative description of the invention, this slowest portion epitomizes the slower timed portions which were referred to hereinbefore. Thus, it is this slowest portion which would unduly limit the processor operating speed in the absence of the present invention. This slowest portion is shown at 6 in the drawing;

3. When the portion 6 is accessed or strobed by the CPU 4, the operation of the portion 6 is timed by the second clock signal; and 4. When the second clock signal is to time the portion 6, the pulse width of that signal is to be doubled with respect to its normal value in order to meet the operating time requirements of the portion 6.

In compliance with the above-stated requirements, the generator 1 normally produces the noted four nonsymmetrical clock signals. Also, when the portion 6 is strobed, the generator 1 doubles the normal width of the second clock signal pulse, and hence varies the symmetry of the clock signals, to meet the operating time requirements of the portion 6.

The relative clock pulse widths so produced are considered to be those which have been found to meet the timing requirements of the processor timed portions, including the slowest portion 6, when the processor is operated at a desirably increased speed. By this it is meant that the generator 1 construction permits the operating speed of the processor to be significantly higher than it would be with a generator of the previously known construction, and does this without requiring any change in the operating time requirements of the timed portions of the processor.

To the end of producing the four clock signals with the relative pulse widths and variable symmetry as described above, the generator 1 includes a 4-bit, serial in/parallel out shift register 7, NAND gates 9 and 11, a NAND gate 13 shown in the form of a NEGATIVE NOR gate, and a D flop 15. The shift register 7 has a SERIAL IN or SHIFT RIGHT terminal 17, a CLOCK terminal 19, a SHIFT ENABLE terminal 21, and QA, QB, QC, and QD parallel output terminals 23, 25, 27, and 29, respectively. The gate 9 has input connections 31, 33, and 35, and an output connection 37. The gate 11 has input connections 39, 41, and 43, and an output connection 45. The gate 13 has input connections 47, 49, and 51, and an output connection 53. Finally, the D flop 15 has a D input terminal 55, a CLOCK terminal 57, and a Q output terminal 59.

Within the generator 1, the output of the master clock 3 is connected to the CLOCK terminal 19 of the shift register 7, and to the CLOCK terminal 57 of the D flop 15. Thus, the output signal or master clock signal of the master clock 3 is applied to the CLOCK terminals of the devices 7 and 15. It is considered herein that the latter are triggered by the positive-going edge of the master clock signal.

The shift register 7 is operated in a recirculating manner in the generator 1. To this end, the QA shift register output terminal 23 is connected to the input 31 of the gate 9. Similarly, the shift register QB and QC output terminals 25 and 27 are connected, respectively, to the inputs 33 and 35 of the gate 9. Finally, the output 37 of the gate 9 is connected to the SERIAL IN terminal 17 of the shift register 7.

As a result of the connections just described, the shift register 7 produces four nonoverlapping clock signals, namely, a PHASE 1 clock signal on the output terminal 23, a PHASE 2 clock signal on the output terminal 25, a PHASE 3 clock signal on the output terminal 27, and a PHASE 4 clock signal on the output terminal 29. Those four clock signals, which will be considered herein to be low active, are conducted from the shift register 7 to the CPU 4 by respective conductors or lines 61, 63, 65, and 67 which are connected, respectively, to the shift register output terminals 23, 25, 27 and 29. Extensions 69 of the lines 61, 63, 65, and 67, external to the generator 1, are included in the FIG. 1 apparatus for supplying the clock signals to the other portions of the processor as required.

In addition to the lines just described, the FIG. 1 processor includes the usual control strobe or control signal lines which make it possible for the CPU 4 to access, or strobe, and control the peripheral portions 5. Three of such lines, 71, 73, and 75, are shown by way of example in FIG. 1.

The control strobe line 71 is shown as being the one of the strobe lines which is responsible for the strobing of the timed portion 6. On the basis that the control strobe or signal on the line 71 is low active, it is considered that, whenever the CPU 4 strobes the portion 6, it does so by making the line 71 go low for approximately one master clock cycle.

As described so far, the generator 1 would cause the four clock signals on the lines 61, 63, 65, and 67 to be symmetrical, that is, to have equal pulse widths. However, the devices 11, 13, and 15 of the generator 1 constitute sequential circuitry which is provided to control the clock pulse widths so as to establish the desired clock signal symmetry conditions and variations noted hereinbefore.

In the first place, the sequential circuitry makes the pulse width of the PHASE 1 and PHASE 3 clock signals twice the pulse width of the normal PHASE 2 and PHASE 4 clock signals, thereby imparting the above-noted desired nonsymmetry to the clock signals. To this end, the PHASE 1 and PHASE 3 clock signals are supplied to the sequential circuitry, and the latter supplies a signal to the SHIFT ENABLE terminal 21 of the shift register 7.

Specifically, the input connections 47 and 49 of the gate 13 are connected, respectively, to the clock signal lines 61 and 65. Also, the output connection 53 of the gate 13 is connected to the input connection 41 of the gate 11. Finally, the output connection 45 of the gate 11 is connected to the SHIFT ENABLE terminal 21 and to the D terminal 55 of the D flop 15, and the Q output terminal 59 of the latter is connected to the input connection 43 of the gate 11. The D flop 15 prevents the PHASE 1 and PHASE 3 clock pulses from being made more than twice as wide as the PHASE 4 clock pulses.

Secondly, the noted sequential circuitry effects the above-described doubling of the PHASE 2 clock pulse width from its normal width when the portion 6 is strobed, thereby varying the clock signal symmetry to accommodate the operating speed of the portion 6. To this end, the input connection 51 of the gate 13 is connected to the control strobe line 71 for the portion 6, and the input connection 39 of the gate 11 is connected to the PHASE 4 clock signal line 67. This latter connection prevents the widening of the PHASE 4 pulses when the control strobe is present on the gate input connection 51 to widen a PHASE 2 pulse.

THE OPERATION OF THE APPARATUS OF FIG. 1

When the processor of FIG. 1 is in operation, the master clock 3 continuously supplies its master clock signal to the CLOCK terminals 19 and 57 of the generator 1. In response, the generator 1 continuously produces and supplies its four clock signals to the CPU 4 by way of the lines 61, 63, 65, and 67. Also, the CPU 4 supplies the control strobe from the line 71 to the gate input connection 51 of the generator sequential circuitry at the times at which the portion 6 is accessed. Such operation of the generator 1 will be described during a typical period of its operation. This typical period consists of three consecutive clock cycles, in only the second of which the timed portion 6 is strobed.

The operation of the generator 1 during the above-noted typical period is illustrated by the curves of FIG. 2. Those curves show, for the noted period, the variations with respect to time which take place in a number of the generator signals.

In the following description, a logic high signal or a logic low signal on a certain terminal, input connection, or output connection will be referred to simply as a high or a low, respectively, on the terminal, input, or output. Also, a given signal is sometimes identified by the reference numeral for the curve which shows the varying value of that signal.

In regard to the gates 11 and 13 of the generator sequential circuitry, it is noted that any low on the inputs of either one of those gates produces a high on the corresponding gate output (NEGATIVE NOR ACTION), and that three highs on the inputs of either one of those gates produces a low on the corresponding gate output (NAND ACTION). Although both of the gates 11 and 13 provide both of these equivalent actions, and hence are identical in construction, the gate 11 has been shown by the NAND symbol because its significant function in the sequential circuitry is a NAND fuction. Similarly, the gate 13 has been shown by the NEGATIVE NOR symbol because its significant function in the sequential circuitry is a NEGATIVE NOR function. Thus, any low on the gate 13 inputs places a high on the gate output 53, but it requires three highs on the gate 11 inputs to place a low on that gate output 45, and hence to put a shift-disabling and clock pulse-widening low on the SHIFT ENABLE terminal 21.

The curves of FIG. 2 include a curve 77 of the master clock signal, a curve 79 of the PHASE 1 clock signal on the line 61, a curve 81 of the PHASE 2 clock signal on the line 63, a curve 83 of the PHASE 3 clock signal on the line 65, and a curve 85 of the PHASE 4 clock signal on the line 67. Also, FIG. 2 includes a curve 87 of the control strobe on the line 71 and on the gate 13 input 51, a curve 89 of the signal on the gate 11 input 41 from the gate 13 output 53, a curve 91 of the signal on the gate 11 input 43 from the flop Q terminal 59, and a curve 93 of the signal on the gate 11 output 45, the flop D terminal 55, and the shift register SHIFT ENABLE terminal 21. It is noted that the latter terminal must be high, at the time that the master clock signal goes high, to permit the shift register 7 to perform its normal circulating shifting action. As shown, the four clock signals, as well as the curve 87 control strobe, are low active.

As shown in FIG. 2, the above-noted exemplary operating period extends from a time T0 to a time T19. In that period, the first clock cycle extends from the time T0 to the time T6, the second clock cycle extends from the time T6 to the time T13, and the third clock cycle extends from the time T13 to the time T19. Each of those clock cycles starts with the rising edge of a pulse of the master clock signal of the curve 77.

The first clock cycle shown in FIG. 2 is a normal clock cycle, since the portion 6 is not strobed during that clock cycle. This is shown by the curve 87, which shows its control strobe to be high, and hence inactive, throughout the first clock cycle. During such a normal clock cycle, the clock pulses have their normal widths. As shown by the curves 77, 79, and 83, the normal pulse widths of the PHASE 1 and PHASE 3 clock signals are equal to two cycles of the master clock signal. As shown by the curves 77, 81, and 85, the normal pulse widths of the PHASE 2 and PHASE 4 clock signals are equal to one cycle of the master clock signal. The sequential circuitry of the generator 1 produces this desired pulse width ratio by inhibiting or defeating the shifting action of the shift register 7 for one and only one master clock cycle during each production of a PHASE 1 or a PHASE 3 clock pulse. This action of the sequential circuitry will now be described with particular reference to the portions of the FIG. 2 curves which lie within the first clock cycle.

Just prior to the time T0, all of the gate 13 inputs are high, as shown by the curves 79, 83, and 87. As a result, the signal on the gate 11 input 41 is low, as shown by the curve 89. As a further result, there is a high on the gate 11 output 45, on the SHIFT ENABLE terminal 21, and on the flop D terminal 55, as shown by the curve 93. Consequently, the rising edge of the master clock signal at the time T0 allows a low to be shifted into the shift register terminal 23 from the gate 9 in the usual manner. This, in turn, causes the PHASE 4 clock signal to go high and the PHASE 1 clock signal to go low, to end the previous PHASE 4 clock pulse and to start the next PHASE 1 clock pulse, all in the usual manner and as shown by the curves 85 and 79.

From the time T0 to a time just prior to the time T1, the PHASE 1 clock signal remains low, as shown by the curve 79, and the other three clock signals remain high, in the usual manner, as shown by the respective curves 81, 83, and 85. Since there is now a low on the gate 13 input 47, the gate 11 input 41 is high, as shown by the curve 89. Also, since the flop D input 55 was high at the time T0, the gate 11 input 43 is now high, as shown by the curve 91. Finally, the gate 11 input 39 is now high because the PHASE 4 clock signal of the curve 85 is high. Consequently, the gate 11 output 45 and the SHIFT ENABLE terminal 21 are now low, as shown by the curve 93.

At the time T1 and next rise of the master clock signal, therefore, at which time the PHASE 1 clock pulse would be terminated in the absence of the sequential circuitry, the low on the SHIFT ENABLE terminal 21 inhibits the shifting action of the shift register 7 and leaves the low on the output terminal 23. Thus, the PHASE 1 clock pulse is not terminated, but is continued and widended as is desired, and as is shown by the curve 79.

Because of the low on the flop D terminal 55 at the time T1, the master clock pulse at the time causes the Q terminal 59, and hence the gate 11 input 43, to go low. This causes the gate 11 output 45 and the terminal 21 to go high. Thus, from the time T1 to a time just prior to the time T2, the terminal 21 is high, as shown by the curve 93. Therefore, at the time T2, the shift register 7 is enabled to move the low from the terminal 23 to the terminal 25, thereby terminating the widened PHASE 1 clock pulse and starting the PHASE 2 clock pulse as shown by the curves 79 and 81.

At the time T2, the high on the flop D terminal 55 causes the gate 11 input 43 to go high. Also, from the time T2 to a time just prior to the time T3, there are three highs on the gate 13 inputs, as shown by the curves 79, 83, and 87. Thus, there is a low on the gate 11 input 41, as shown by the curve 89. This low keeps a high on the terminal 21, as shown by the curve 93, so that, at the time T3, the shift register 7 is enabled to move the low from the terminal 25 to the terminal 27, thereby terminating the PHASE 2 clock pulse and starting the PHASE 3 clock pulse.

At the time T3, the start of the PHASE 3 clock pulse puts a low on the gate 13 input 49, causing the gate 11 input 41 to go high. Thus, from the time T3 to a time just prior to the time T4, there are three highs on the gate 11 inputs, as shown by the curves 85, 89, and 91. Consequently, the gate 11 output 45 and the terminal 21 are now low, as shown by the curve 93.

At the time T4 at which the PHASE 3 clock pulse would be terminated in the absence of the sequential circuitry, the shift enable signal is low, as noted above. This again inhibits the shifting action of the shift register 7, prevents the termination of the PHASE 3 CLOCK PULSE, and extends and widens the latter as is desired. Therefore, from the time T4 to a time just prior to the time T5, the PHASE 3 clock signal is kept low to widen the PHASE 3 clock pulse, as shown by the curve 83.

Because of the low on the flop D terminal 55 at the time T4, the Q terminal 59 and the gate 11 input 43 go low at that time. Just prior to the time T5, therefore, that low makes the gate 11 output 45 and the terminal 21 high. Accordingly, at the time T5, the shift register 7 is enabled to move the low from the terminal 27 to the terminal 29, thereby terminating the widened PHASE 3 clock pulse and starting the PHASE 4 clock pulse, as shown by the curves 83 and 85.

At the time T5, the high on the flop D terminal 55 causes the gate 11 input 43 to go high. Also, from the time T5 to a time just prior to the time T6, there are three highs on the gate 13 inputs, as shown by the curves 79, 83, and 87. Thus, there is a low on the gate 11 input 41, as shown by the curve 89, This low keeps a high on the terminal 21, as shown by the curve 93, so that, at the time T6, the shift register 7 is enabled to move the low from the terminal 29 back to the terminal 23, thereby terminating the PHASE 4 clock pulse and starting the next PHASE 1 clock pulse of the second clock cycle.

The operation described above would continue as long as the control strobe of the curve 87 remained high. At the end of the first half of each of the PHASE 1 and PHASE 3 clock pulses, the SHIFT ENABLE signal on the terminal 21 is low so as to prevent the shifting action from taking place and thus to widen the respective clock pulse. At the end of the second master clock pulse of each widened clock pulse, however, the D flop 15 is low to cause the SHIFT ENABLE signal to be high so that the desired termination of the widened clock pulse takes place.

In the second clock cycle shown in FIG. 2, the widened PHASE 1 clock pulse is produced between the times T6 and T8 as it was between the times T0 and T2. In this second clock cycle, however, the control strobe on the line 71 goes low at the time T7, as shown by the curve 87. This places a low on the gate 13 input 51 throughout the rest of this second clock cycle, whereby the gate 11 input 41 remains high throughout this clock cycle, as shown by the curve 89.

Just prior to the time T8, the lows on the gate 13 inputs make the gate 11 input 41 high as noted above. Also, the gate 11 input 39 is high, as shown by the curve 85. But the gate 11 input 43 is low at this time, as shown by the curve 91, so that the gate 11 output and the terminal 21 are high, as shown by the curve 93. Consequently, at the time T8, the shift register 7 is enabled to move the low from the terminal 23 to the terminal 25, the widened PHASE 1 clock pulse is terminated, and the PHASE 2 clock pulse is started.

Also at the time T8, the flop 15 makes the gate 11 terminal 43 go high. From the time T8 to a time just prior to the time T9, therefore, there are three highs on the gate 11 inputs, as shown by the curves 85, 89, and 91. Thus, the terminal 21 is now low. At the time T9, therefore, the shift register 7 is not enabled to shift, and the PHASE 2 clock pulse is not terminated, but instead is continued. A comparison between the curve 93 at the times T3 and T9 shows that the continuation of the PHASE 2 clock pulse at the time T9 is due to the presence of the curve 87 control strobe and to the resulting high on the gate 11 input 41, as shown by the curve 89.

At the time T9, the gate 11 input 43 goes low, making the terminal 21 go high. At the time T10, therefore, the high on the terminal 21 enables the shift register 7 so that the widened PHASE 2 clock pulse is terminated, and the PHASE 3 clock pulse is started. Thereafter, the latter is widened as it was in the first clock cycle.

In summary, at the end of the first half of the PHASE 2 clock pulse at the time T9, the shift enable signal is low because of the control strobe having produced three highs on the gate 11 inputs. Consequently, the PHASE 2 clock pulse does not end at the time T9 as it otherwise would, but is extended to the time T10. By the time T10, however, the previous shifting of the D flop output on the gate 11 input 43 to a low makes the shift enable signal high, so that the PHASE 2 clock pulse is not widened more than is desired.

In the first clock cycle, there was no tendency to lengthen the PHASE 4 clock pulse past the time T6 because of the high present on the gate 13 input connection 51 which kept a low on the gate 11 input 41. Just prior to the time T13, however, the continued low on the gate 13 input 51 causes the gate 11 input 41 to be high. However, just prior to the time T13, the gate 11 input 39 is held low by the PHASE 4 clock pulse, as shown by the curve 85. This low on the gate 11 causes the terminal 21 to be high at the time T13, as shown by the curve 93, so that the proper termination of the PHASE 4 clock pulse, and the beginning of the PHASE 1 clock pulse, can take place.

The continued operation of the generator 1 throughout the third clock cycle of FIG. 2 is essentially the same as that described above in connection with the operation during the first clock cycle. The fact that the control strobe of the curve 87 is stll low on the gate 13 input 51 up to the time T14 of the third clock cycle does not influence the operation of this normal clock cycle, since there is already a low on the gate 13 input 47, whereby the additional low on the input 51 is redundant.

The foregoing description shows the manner in which the sequential circuitry of the generator 1 both normally lengthens the PHASE 1 and PHASE 3 clock pulses with respect to the PHASE 2 and PHASE 4 clock pulses, and similarly lengthens the PHASE 2 clock pulses when the timed portion 6 is strobed. As is apparent from FIG. 1, this desirable operation is provided by, and requires, only a relatively simple circuit arrangement. Moreover, as the FIG. 2 curves make apparent, the sequential circuitry provides improved processor operating speed by not requiring every clock cycle to have the extra length that it would need to have for properly timing the portion 6, but by lengthening, instead, only those specific clock cycles wherein the portion 6 is actually accessed. Since such accessing takes place only periodically, the lengthening of only the needed ones of the clock cycles gives a shorter average clock cycle, and an overall higher processor operating speed, than are obtained when the known clock generator constructions are employed, wherein each and every clock cycle is made sufficiently long so that the slowest processor portion can be properly timed if that portion happens to be accessed during that clock cycle. In so improving the processor operating speed, the described circuitry makes that speed significantly less affected, and hence less degraded, by the operating time requirements of the slower processor portions without requiring any changes in such requirements, and without introducing any tendency to shortchange such slower portions.

Although the illustrated apparatus has been shown, by way of example, as including only a single portion whose operating time requirements are such as to require the widening of the corresponding timing clock pulse, it is to be understood that the invention is applicable as well to those situations wherein there is more than one such portion. Thus, the clock generator of the invention might well widen the same clock pulse at different times to accommodate different timed portions, and/or might well widen the clock pulse of one clock signal to accommodate each member of one group of slower portions, and widen the clock pulse of another clock signal to accommodate each member of another group of slower portions. The criterion in each case is that the only pulses that are widened are ones which are actively responsible for the timing of portions whose operating speeds require such widening in order that valid operation of those portions be obtained.

By way of illustration and example, and not by way of limitation, it is noted that typical values and component types for the FIG. 1 apparatus are as follows:
Shift Register 7—Type 74S194
Gates 9, 11, and 13—Type 74S10
Flop 15—Type 74S74
Master Clock Signal Frequency—12 Megahertz
Normal Clock Cycle Time—500 Nanoseconds
Clock Cycle Time When Portion 6 Strobed—583⅓ Nanoseconds It is believed to be clear from the foregoing description that the described apparatus fulfills the objects stated herein. Thus, it has been shown that the described processor is endowed with a higher operating speed by a clock generator of novel but relatively simple construction which achieves the operating speed improvement without requiring increases in any of the operating speeds of the timed portions of the processor and without shortchanging the slower ones of such portions. Instead, the novel clock generator achieves the processor operating speed improvement by so varying the symmetry of the nonsymmetrical clock signals which it produces that it lengthens only those specific clock pulses and cycles which actually require lengthening in order to properly time the slower portions.

The embodiments of the invention in which an exclusive property or privilege is claimed are defined as follows:

1. In clock generator apparatus including a circulating shift register portion having a master clock input connection, a shift enable connection, and a plurality of parallel output connections, said portion, in the presence of a shift enabling signal on said shift enable connection, being responsive to a master clock signal applied to said clock input connection to circulate a logic bit among said output connections under the control of said master clock signal, thereby to produce at each of said output connections a corresponding one of a group of clock phase signals, each of which consists of a series of pulses of widths related to the master clock signal period, the improvement for imparting a desired nonsymmetry to said clock phase signals, comprising gating means having inputs connected to said output connections to receive said clock phase signals, having an output connected to said shift enable connection, and operative to apply a shift enabling signal to said shift enable connection in the presence of certain of said pulses to terminate the latter, and to suspend said application of said shift enabling signal to said shift enable connection in the presence of others of said pulses to widen the latter, and bistable means connected to receive said shift enabling signal and connected to said inputs of said gating means to cause the latter to produce said shift enabling signal in each master clock signal period following one in which the application of said shift enabling signal was suspended, thereby to limit the extent of said widening of said other pulses.

2. In clock generator apparatus including a circulating shift register portion having a master clock input connection, a shift enable connection, and a plurality of parallel output connections, said portion, in the presence of a shift enabling signal on said shift enable connection, being responsive to a master clock signal applied to said clock input connection to circulate a logic bit among said output connections under the control of said master clock signal, thereby to produce at each of said output connections a corresponding one of a group of clock phase signals, each of which consists of a series of pulses of widths related to the master clock signal period, the improvement for imparting a desired nonsymmetry to said clock phase signals and for varying the symmetry thereof on demand, comprising gating means having inputs connected to a signal source to receive a control signal and connected to said portion output connections to receive said clock phase signals, and having an output connected to said shift enable connection, said gating means being responsive to said clock phase signals to apply a shift enabling signal to said shift enable connection in the presence of certain of said pulses to terminate the latter, and to suspend said application of said shift enabling signal to said shift enable connection in the presence of others of said pulses to widen the latter, thereby to impart a desired nonsymmetry to said clock phase signals, said gating means being responsive also to said control signal to suspend the application of said shift enabling signal to said shift enable connection, to widen the current one of said pulses, when said control signal has a predetermined value, thereby to vary the symmetry of said clock phase signals as demanded by said control signal, and bistable means connected to receive said shift enabling signal and connected to said inputs of said gating means to cause the latter to produce said shift enabling signal in each master clock signal period following one in which the application of said shift enabling signal was suspended, thereby to limit the extent of said widening of said pulses.

3. In clock generator apparatus for use in data processing apparatus including a plurality of portions whose operation is to be timed, and including processor means for accessing and sequencing the operation of said portions, certain of said portions requiring more time to operate in a valid manner, when accessed, than others of said portions, said generator apparatus including generator means responsive to a master clock signal for producing a plurality of clock phase pulse signals for selective timing application to said portions as dictated by said processor means, the improvement for varying the symmetry of said pulse signals, comprising sequential logic means having inputs connected to receive said pulse signals, having a demand input connected to said processor means to receive therefrom a control signal indicative of the accessing by said processor means of a one of said certain portions to be timed by a corresponding one of said pulse signals, having an output connected to said generator means, and operative in the absence of said control signal to apply a terminating signal to said generator means to terminate the pulses of said pulse signals, operative in response to the presence of said control signal to suspend the application of said terminting signal to said generator means to widen solely those pulses of said corresponding pulse signal which occur during the presence of said control signal, and operative to apply a terminating signal to said generator means at a selected time following said suspension of said application, thereby to widen the ones of said pulses which effect the timing of the accessed one of said certain portions and to limit the extent of that widening to a selected value.

4. In clock generator apparatus for use in data processing apparatus including a plurality of peripheral portions whose operation is to be timed, and including processor means for accessing and sequencing the operation of said portions, certain of said portions requiring more time to operate in a valid manner, when accessed, than others of said portions, said generator apparatus including a circulating shift register portion having a master clock input connection, a shift enable connection, and a plurality of parallel output connections, said register portion, in the presence of a shift enabling signal on said shift enable connection, being responsive to a master clock signal applied to said clock input connection to circulate a logic bit among said output connections under the control of said master clock signal, thereby to produce at each of said output connections a corresponding one of a group of clock phase signals which are selectively responsible for the timing of said peripheral portions as dictated by said processor means, each of said clock phase signals consisting of a series of pulses of widths related to the master clock signal period, the improvement for varying the symmetry of said clock phase signals, comprising gating means having an output connected to said shift enable connection and having inputs connected to said register portion output connections to receive said clock phase signals and connected to said processor means to receive therefrom a control signal indicative of the accessing by said processor means of a one of said certain portions, said gating means being responsive to said clock phase signals and to said control signal to apply a pulse terminating shift enabling signal to said shift enable connection in the absence of said control signal, and to suspend said application of said shift enabling signal to said shift enable connection in the presence of said control signal and a pulse of that one of said clock phase signals responsible for the timing of said one of said certain portions, thereby to widen the last-mentioned pulse, and means connected to said gating means to cause a pulse terminating shift enabling signal to be applied to said shift enable connection at a selected time following said suspension of said application, thereby to limit the extent of said widening of the widened one of said pulses to a selected value.

5. In clock generator apparatus for use in data processing apparatus including a plurality of peripheral portions whose operation is to be timed, and including processor means for accessing and sequencing the operation of said portions, certain of said portions requiring more time to operate in a valid manner, when accessed, than others of said portions, said generator apparatus including a circulating shift register portion having a master clock input connection, a shift enable connection, and a plurality of parallel output connections, said register portion, in the presence of a shift enabling signal on said shift enable connection, being responsive to a master clock signal applied to said clock input connection to circulate a logic bit among said output connections under the control of said master clock signal, thereby to produce at each of said output connections a corresponding one of a group of clock phase signals which are selectively responsible for the timing of said peripheral portions as dictated by said processor means, each of said clock phase signals consisting of a series of pulses of widths related to the master clock signal period, the improvement for imparting a desired nonsymmetry to said clock phase signals and for varying the symmetry thereof on demand, comprising gating means having an output connected to said shift enable connection and having inputs connected to said register portion output connections to receive said clock phase signals and connected to said processor means to receive therefrom a control signal indicative of the accessing by said processor means of a one of said certain portions, said gating means being responsive to said clock phase signals to apply a shift enabling signal to said shift enable connection in the presence of certain of said pulses to terminate the latter, and to suspend said application of said shift enabling signal to said shift enable connection in the presence of others of said pulses to widen the latter, thereby to impart a desired nonsymmetry to said clock phase signals, said gating means being responsive also to said control signal to suspend the application of said shift enabling signal to said shift enable connection in the presence of said control signal and a pulse of that one of said clock phase signals responsible for the timing of said one of said certain portions, thereby to widen the last-mentioned pulse and to vary the symmetry of said clock phase signals as demanded by said control signal, and bistable means connected to receive said shift enabling signal and connected to said inputs of said gating means to cause the latter to produce said shift enabling signal in each master clock signal period following one in which the application of said shift enabling signal was suspended, thereby to limit the extent of said widening of said pulses.

6. In data processing apparatus including a master clock for producing a master clock signal, including a plurality of portions whose operation is to be timed in accordance with said clock signal, including a central processing unit for accessing and sequencing the operation of said portions, and including clock generator apparatus having generator means responsive to said signal for producing a plurality of clock phase pulse signals for selectively effecting said timing of the operation of said portions when accessed by said unit, said operation of certain of said portions requiring more time than said operation of others of said portions, an improved form of said generator apparatus which varies the symmetry of said pulse signals, comprising sequential logic means having inputs connected to receive said pulse signals, having a demand input connected to said unit to receive therefrom a control signal indicative of the accessing by said unit of a one of said certain portions to be timed by a corresponding one of said pulse signals, having an output connected to said generator means, and operative in the absence of said control signal to apply a terminating signal to said generator means to terminate the pulses of said pulse signals, operative in response to the presence of said control signal to suspend the application of said terminating signal to said generator means to widen solely those pulses of said corresponding pulse signal which occur during the presence of said control signal, and operative to apply a terminating signal to said generator means at a selected time following said suspension of said application, thereby to widen the ones of said pulses which effect the timing of the accessed one of said certain portions and to limit the extent of that widening to a selected value.

7. In data processing apparatus having a master clock for producing a master clock signal, having a plurality of peripheral portions whose operation is to be timed in accordance with said clock signal, having a central processing unit for accessing and sequencing the operation of said portions, and having clock generator apparatus including a circulating shift register portion having a master clock input connection receiving said master clock signal, a shift enable connection, and a plurality of parallel output connections, said register portion, in the presence of a shift enabling signal on said shift enable connection, being responsive to said master clock signal to circulate a logic bit among said output connections under the control of said master clock signal, thereby to produce at each of said output connections a corresponding one of a group of clock phase signals which are selectively responsible for the timing of said peripheral portions as dictated by said unit, certain of said portions requiring more time to operate in a valid manner, when accessed, than others of said portions, each of said clock phase signals consisting of a series of pulses of widths related to the master clock signal period, an improved form of said generator apparatus which varies the symmetry of said clock phase signals, comprising gating means having an output connected to said shift enable connection and having inputs connected to said register portion output connections to receive said clock phase signals and connected to said unit to receive therefrom a control signal indicative of the accessing by said unit of a one of said certain portions, said gating means being responsive to said clock phase signals and to said control signal to apply a pulse terminating shift enabling signal to said shift enable connection in the absence of said control signal, and to suspend said application of said shift enabling signal to said shift enable connection in the presence of said control signal and a pulse of that one of said clock phase signals responsible for the timing of said one of said certain portions, thereby to widen the last-mentioned pulse, and means connected to said gating means to cause a pulse terminating shift enabling signal to be applied to said shift enable connection at a selected time following said suspension of said application, thereby to limit the extent of said widening of the widened one of said pulses to a selected value.

8. In data processing apparatus having a master clock for producing a master clock signal, having a plurality of peripheral portions whose operation is to be timed in accordance with said clock signal, having a central processing unit for accessing and sequencing the operation of said portions, and having clock generator apparatus including a circulating shift register portion having a master clock input connection receiving said master clock signal, a shift enable connection, and a plurality of parallel output connections, said register portion, in the presence of a shift enabling signal on said shift enable connection, being responsive to said master clock signal to circulate a logic bit among said output connections under the control of said master clock signal, thereby to produce at each of said output connections a corresponding one of a group of clock phase signals which are selectively responsible for the timing of said peripheral portions as dictated by said unit, certain of said portions requiring more time to operate in a valid manner, when accessed, than others of said portions, each of said clock phase signals consisting of a series of pulses of widths related to the master clock signal period, an improved form of said generator apparatus which imparts a desired nonsymmetry to said clock phase signals and which varies the symmetry thereof on demand, comprising gating means having an output connected to said shift enable connection and having inputs connected to said register portion output connections to receive said clock phase signals and connected to said unit to receive therefrom a control signal indicative of the accessing by said unit of a one of said certain portions, said gating means being responsive to said clock phase signals to apply a shift enabling signal to said shift enable connection in the presence of certain of said pulses to terminate the latter, and to suspend said application of said shift enabling signal to said shift enable connection in the presence of others of said pulses to widen the latter, thereby to impart a desired nonsymmetry to said clock phase signals, said gating means being responsive also to said control signal to suspend the application of said shift enabling signal to said shift enable connection in the presence of said control signal and a pulse of that one of said clock phase signals responsible for the timing of said one of said certain portions, thereby to widen the last-mentioned pulse and to vary the symmetry of said clock phase signals as demanded by said control signal, and bistable means connected to receive said shift enabling signal and connected to said inputs of said gating means to cause the latter to produce said shift enabling signal in each master clock signal period following one in which the application of said shift enabling signal was suspended, thereby to limit the extent of said widening of said pulses.

9. Clock generator apparatus, comprising a circulating shift register portion having a master clock input connection, a shift enable connection, and a plurality of parallel output connections, said portion, in the presence of a shift enabling signal on said shift enable connection, being responsive to a master clock signal applied to said clock input connection to circulate a logic bit among said output connections under the control of said master clock signal, thereby to produce at each of said output connections a corresponding one of a group of clock phase signals, each of which consists of a series of pusles of widths related to the master clock signal period, a first NAND gate having input connections connected to said output connections and having an output connection, a second NAND gate having an input connection connected to said output connection of said first gate and having an output connection connected to said shift enable connection, and a D flop having a clock input connection connected to said register clock input connection, having a D input connection connected to said shift enable connection, and having a Q output connection connected to a second input connection of said second gate, whereby said second gate selectively applies shift enabling signals to said shift enable connection and suspends said application as required to double the pulse widths of predetermined ones of said clock phase signals.

10. Apparatus as specified in claim 9, wherein said first gate includes a further input connection connected to a source of a control signal to cause the latter to so control said application of said shift enabling signal to said shift enable connection that the width of a pulse of another of said clock phase signals is doubled on demand by said control signal.

11. Clock generator apparatus, comprising first means having a clock input connection connected to receive a master clock pulse signal, having a control connection, and having a plurality of output connections, said first means producing in each of said output connections a corresponding one of a group of clock phase signals, each of which consists of a series of clock pulses of widths related to the pulse width of said master clock signal, said first means terminating each of said clock pulses upon the appearance of a terminating signal at said control connection, and sequential logic means having a clock input connected to receive said master clock pulse signal, having inputs connected to said output connections to receive said clock phase signals, having an output connected to said control connection of said first means, and operative to apply a terminating signal to said control connection in the presence of ones of said clock pulses to terminate the latter, operative to suspend said application of said terminating signal to said control connection in the presence of others of said clock pulses to widen the latter with respect to said ones of said clock pulses, and operative to apply said terminating signal to said control connection in a selected one of said master clock signal pulses following one of the latter in which said suspension of said application took place, thereby to limit the extent of said widening of said others of said clock pulses to a selected number of said master clock signal pulses.

12. Clock generator apparatus, comprising first means having a clock input connection connected to receive a master clock pulse signal, having a control connection, and having a plurality of output connections, said first means producing in each of said output connections a corresponding one of a group of clock phase signals, each of which consists of a series of clock pulses of widths related to the pulse width of said master clock signal, said first means terminating each of said clock pulses upon the appearance of a terminating signal at said control connection, and sequential logic means having a clock input connected to receive said master clock pulse signal, having inputs connected to said output connections to receive said clock phase signals, having an output connected to said control connection of said first means, and operative to apply a terminating signal to said control connection in the presence of specific ones of said clock pulses to terminate the latter with a fixed width, operative to suspend said application of said terminating signal to said control connection in the presence of the remainder of said clock pulses to widen the latter with respect to said specific ones of said clock pulses, and operative to apply said terminating signal to said control connection in a selected one of said master clock signal pulses following one of the latter in which said suspension of said application took place, thereby to limit the extent of said widening of said remainder of said clock pulses to a selected number of said master clock signal pulses to impart a preselected nonsymmetry to said clock phase signals.

13. Clock generator apparatus, comprising first means having a clock input connection connected to receive a master clock pulse signal, having a control connection, and having a plurality of output connections, said first means producing in each of said output connections a corresponding one of a group of clock phase signals, each of which consists of a series of clock pulses of widths related to the pulse width of said master clock signal, said first means terminating each of said clock pulses upon the appearance of a terminating signal at said control connection, and sequential logic means having a clock input connected to receive said master clock pulse signal, having inputs connected to said output connections to receive said clock phase signals, having a demand input connected to a signal source to receive a control signal, having an output connected to said control connection of said first means, and operative in the presence of one value of said control signal to apply a terminating signal to said control connection to terminate the corresponding ones of said clock pulses, operative in the presence of another value of said control signal to suspend said application of said terminating signal to said control connection to widen selected ones of said clock pulses with respect to said terminated ones of said clock pulses, and operative to apply said terminating signal to said control connection in a selected one of said master clock signal pulses following one of the latter in which said suspension of said application took place, thereby to limit the extent of said widening of the widened ones of said clock pulses to a selected number of said master clock signal pulses to vary the symmetry of said clock phase signals.

14. Clock generator apparatus, comprising first means having a clock input connection connected to receive a master clock pulse signal, having a control connection, and having a plurality of output connections, said first means producing in each of said output connections a corresponding one of a group of clock phase signals, each of which consists of a series of clock pulses of widths related to the pulse width of said master clock signal, said first means terminating each of said clock pulses upon the appearance of a terminating signal at said control connection, and sequential logic means having a clock input connected to receive said master clock pulse signal, having inputs connected to said output connections to receive said clock phase signals, having a demand input connected to a signal source to receive a control signal, having an output connected to said control connection of said first means, and operative to apply a terminating signal to said control connection in the presence of specific ones of said clock pulses to terminate the latter with a fixed width, operative to suspend said application of said terminating signal to said control connection in the presence of the remainder of said clock pulses to widen the latter with respect to said specific ones of said clock pulses, operative in the presence of a widen value of said control signal to suspend said application of said terminating signal to said control connection to widen selected ones of said specific ones of said clock pulses with respect to the terminated ones of said clock pulses, and operative to apply said terminating signal to said control connection in a selected one of said master clock signal pulses following one of the latter in which said suspension of said application took place, thereby to limit the extent of said widening of the widened ones of said clock pulses to a selected number of said master clock signal pulses to impart a varying nonsymmetry to said clock phase signals.

* * * * *